(12) United States Patent
Kobres et al.

(10) Patent No.: US 9,471,811 B2
(45) Date of Patent: Oct. 18, 2016

(54) LEARNING A NEW PERIPHERAL USING A SECURITY PROVISIONING MANIFEST

(71) Applicants: Erick Christian Kobres, Lawrenceville, GA (US); Ron William Rogers, Suwanee, GA (US)

(72) Inventors: Erick Christian Kobres, Lawrenceville, GA (US); Ron William Rogers, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/872,252

(22) Filed: Apr. 29, 2013

(65) Prior Publication Data

US 2014/0068248 A1    Mar. 6, 2014

Related U.S. Application Data

(60) Provisional application No. 61/720,645, filed on Oct. 31, 2012, provisional application No. 61/695,978, filed on Aug. 31, 2012.

(51) Int. Cl.
| | |
|---|---|
| H04L 9/32 | (2006.01) |
| G06F 21/70 | (2013.01) |
| G06Q 20/20 | (2012.01) |
| H04L 29/06 | (2006.01) |
| H04L 12/24 | (2006.01) |
| G06Q 20/00 | (2012.01) |
| G06F 21/82 | (2013.01) |

(52) U.S. Cl.
CPC .............. *G06F 21/70* (2013.01); *G06F 21/82* (2013.01); *G06Q 20/00* (2013.01); *G06Q 20/202* (2013.01); *H04L 9/321* (2013.01); *H04L 41/28* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 5,663,547 A |  | 9/1997 | Ziarno |
| 5,742,845 A | * | 4/1998 | Wagner .......................... 710/11 |

(Continued)

OTHER PUBLICATIONS

Wang, Yu; Lu, Jun,; Wu, Zhongwang. Component Based Security Control for Information Network. IMACS Multiconference on Computational Engineering in Systems Applications. Pub. Date: 2006. Relevant pp. 1357-1360. http://ieeexplore. ieee.org/stamp/stamp.jsp?tp=&arnumber=4 1 05593.

(Continued)

*Primary Examiner* — Minh Dinh
*Assistant Examiner* — Wayne An
(74) *Attorney, Agent, or Firm* — Harden E. Stevens, III; Schwegman, Lundberg, Woessner

(57) ABSTRACT

A secure provisioning manifest used to authenticate and securely communicate with peripherals attached to a computer is provided with techniques to learn about a new peripheral not authorized to be attached to the computer and possibly gain authorization for the peripheral. A secure I/O module, that is separate from an operating system and transaction software executed by a processor of the computer, uses the secure provisioning manifest to authenticate and establish a secure encrypted session for communicating with each peripheral authorized to be attached to the computer. When an unauthorized peripheral is found, identifying information for the peripheral is transmitted to an enterprise provisioning server with a request to authorize the peripheral.

17 Claims, 9 Drawing Sheets

(56) References Cited

U.S. PATENT DOCUMENTS

| | | | |
|---|---|---|---|
| 5,799,068 A | 8/1998 | Kikinis et al. | |
| 6,408,406 B1 | 6/2002 | Parris | |
| 6,836,670 B2 | 12/2004 | Castrogiovanni et al. | |
| 7,004,385 B1 | 2/2006 | Douglass | |
| 7,213,766 B2 | 5/2007 | Ryan et al. | |
| 7,325,134 B2 | 1/2008 | Fascenda | |
| 7,409,563 B2* | 8/2008 | Howard et al. | 713/194 |
| 7,529,371 B2 | 5/2009 | Chen et al. | |
| 7,597,250 B2 | 10/2009 | Finn | |
| 7,940,932 B2 | 5/2011 | Paksoy et al. | |
| 8,009,830 B2 | 8/2011 | Orsini et al. | |
| 8,150,370 B2* | 4/2012 | Dempo et al. | 455/411 |
| 8,254,578 B2 | 8/2012 | Paksoy et al. | |
| 8,341,729 B2* | 12/2012 | Mandava | 726/17 |
| 8,355,982 B2* | 1/2013 | Hazel et al. | 705/38 |
| 8,660,943 B1 | 2/2014 | Chirehdast | |
| 8,677,343 B2* | 3/2014 | Averbuch et al. | 717/171 |
| 2003/0041092 A1 | 2/2003 | Woo | |
| 2003/0126236 A1 | 7/2003 | Marl et al. | |
| 2004/0230677 A1* | 11/2004 | O'Hara | 709/224 |
| 2005/0235091 A1 | 10/2005 | Chen et al. | |
| 2007/0209072 A1 | 9/2007 | Chen | |
| 2007/0271383 A1 | 11/2007 | Kim et al. | |
| 2008/0013726 A1 | 1/2008 | Kuriya et al. | |
| 2009/0198618 A1 | 8/2009 | Chan et al. | |
| 2010/0235833 A1* | 9/2010 | Huang et al. | 718/1 |
| 2011/0055546 A1 | 3/2011 | Klassen et al. | |
| 2011/0087869 A1* | 4/2011 | Teranoshita | 713/1 |
| 2011/0215146 A1 | 9/2011 | Shams | |
| 2011/0246756 A1 | 10/2011 | Smith et al. | |
| 2011/0259693 A1 | 10/2011 | Nascarella | |
| 2012/0099720 A1 | 4/2012 | Soundar | |
| 2012/0192203 A1 | 7/2012 | Corry et al. | |
| 2012/0289193 A1 | 11/2012 | Bergenwall | |
| 2012/0331202 A1 | 12/2012 | Cohen | |
| 2013/0124630 A1* | 5/2013 | Reunamaki et al. | 709/204 |

OTHER PUBLICATIONS

Xu, Jian; Pan, TieJun; Zheng, LeiNa. Design and Implementation of High Security Mobile Payment System. 2012 International Conference on Communication Systems and Network Technologies (CSNT). Pub. Date: 2012. Relevant pp. 493-497. http://i eeexp lore. ieee .o rg/s tamp/stamp .jsp ?tp=&arn umber =6200693.

* cited by examiner

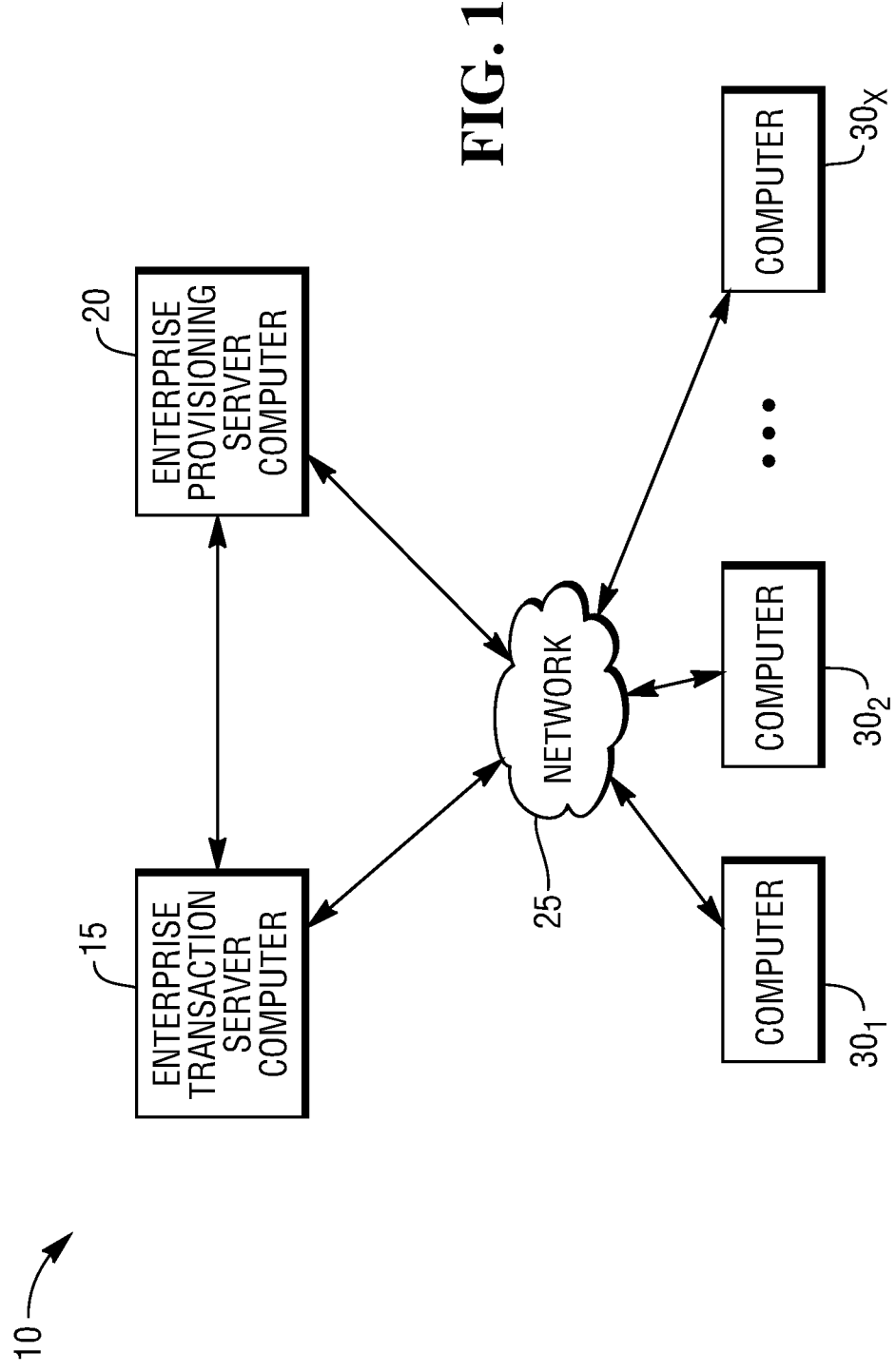

FIG. 5

| SECURE PROVISIONING MANIFEST |
|---|
| 1. SECURE TRANSACTION SERVICE ID |
| 2. SECURE I/O MODULE ID |
| 3. ISSUE DATE |
| 4. EXPIRE DATE |
| 5. GRACE PERIOD |
| 6. POLICY RECORD SET 1 (PIN) |
| 7. POLICY RECORD SET 1 (PIN) |
| 8. POLICY RECORD SET 2 (STS) |
| 9. POLICY RECORD SET 3 (SCAN) |
| 10. POLICY RECORD SET 4 (MSR) |
| 11. POLICY RECORD SET 5 (NFC) |
| 12. POLICY RECORD SET 6 (NETWORK) |

| ID | PUBLIC KEY | VENDOR ID | PID | SERIAL NO. | POLICY SET |
|---|---|---|---|---|---|
| A456 | ************ | NCR | 5999 | ----- | PIN |
| S123 | ************ | NCR | 9800 | ----- | STS |
| A345 | ************ | NCR | 7899 | ----- | SCAN |
| A234 | ************ | NCR | 5949 | ----- | MSR |
| A567 | ************ | NCR | 1299 | ----- | NFC |

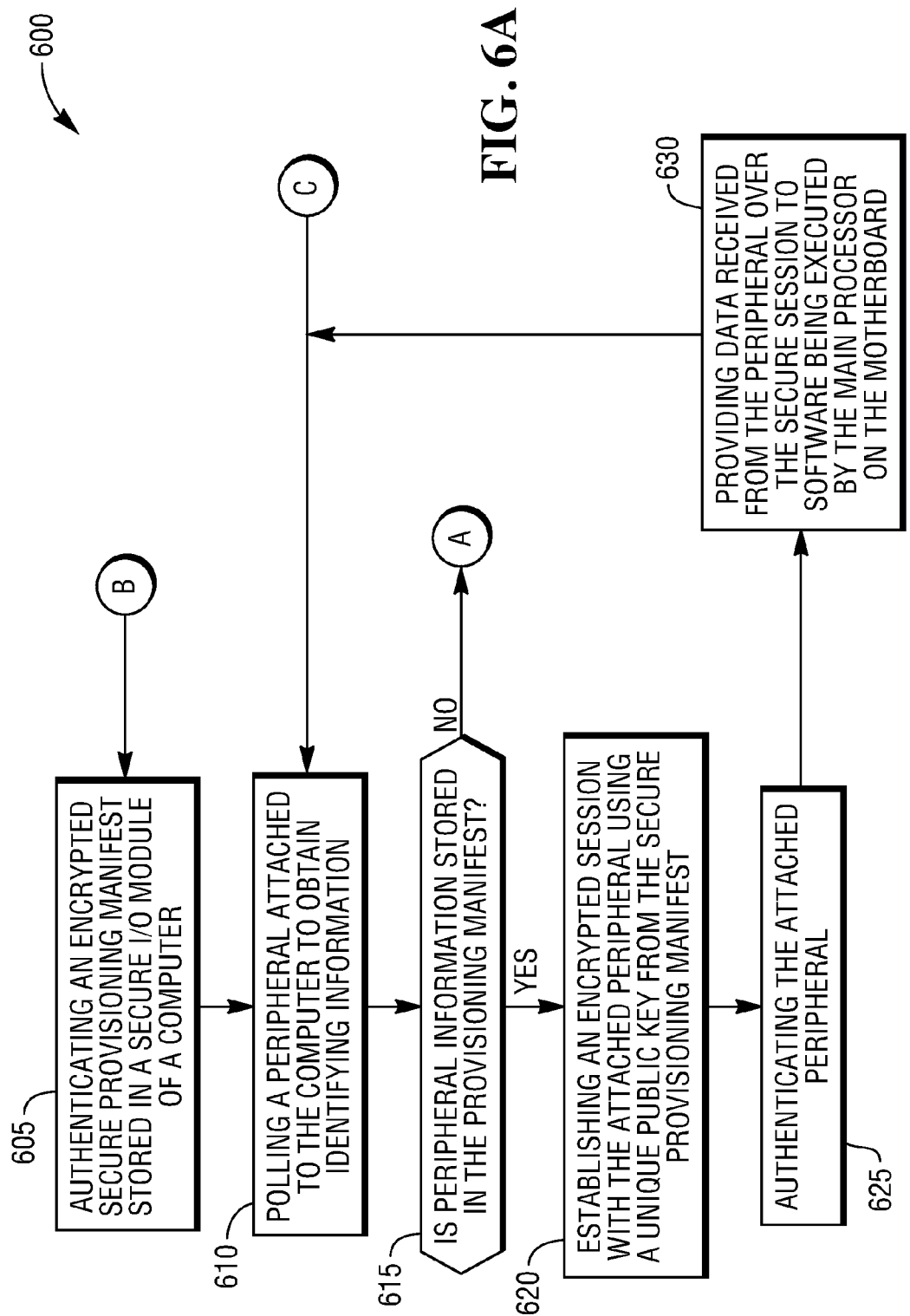

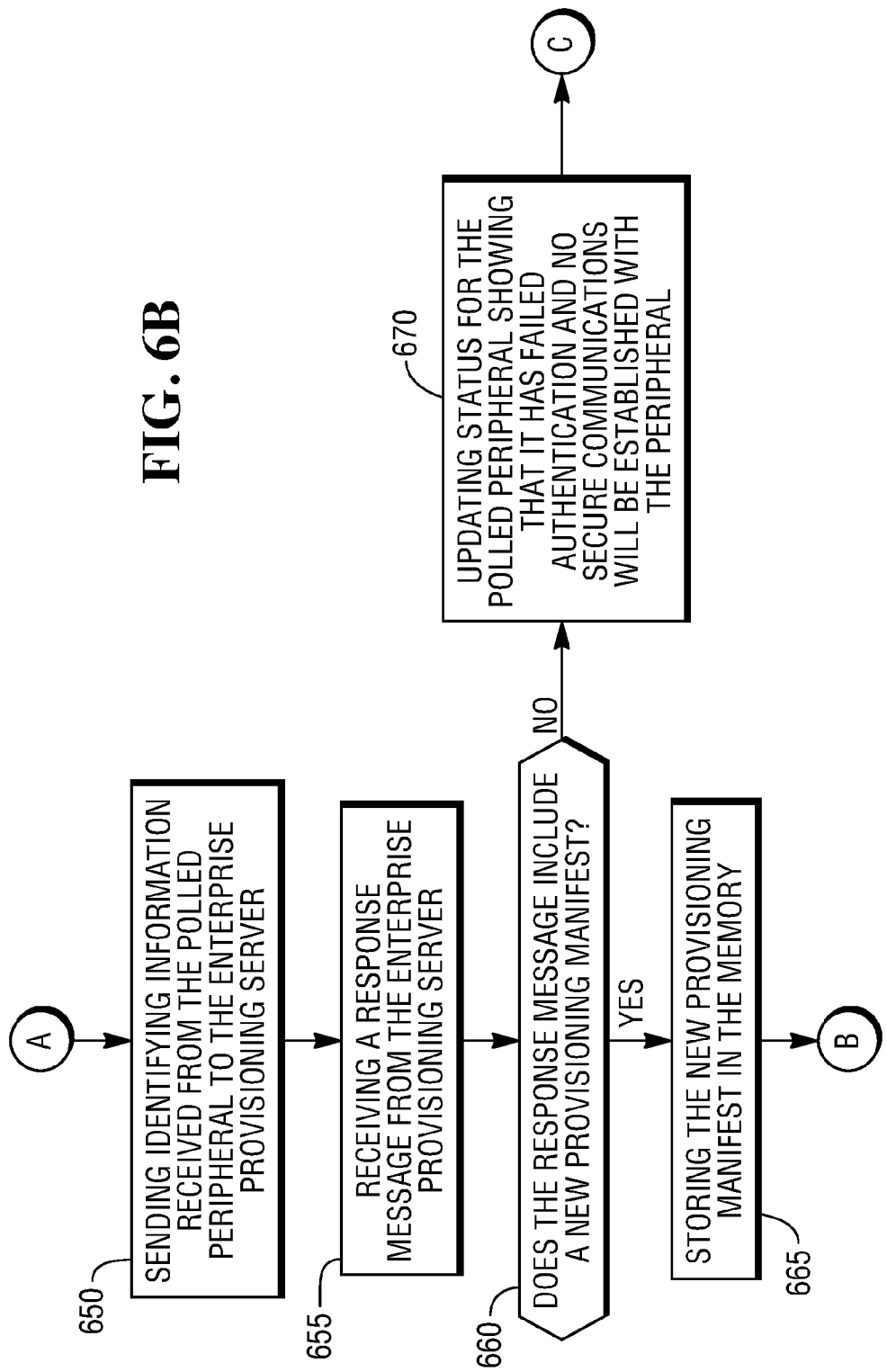

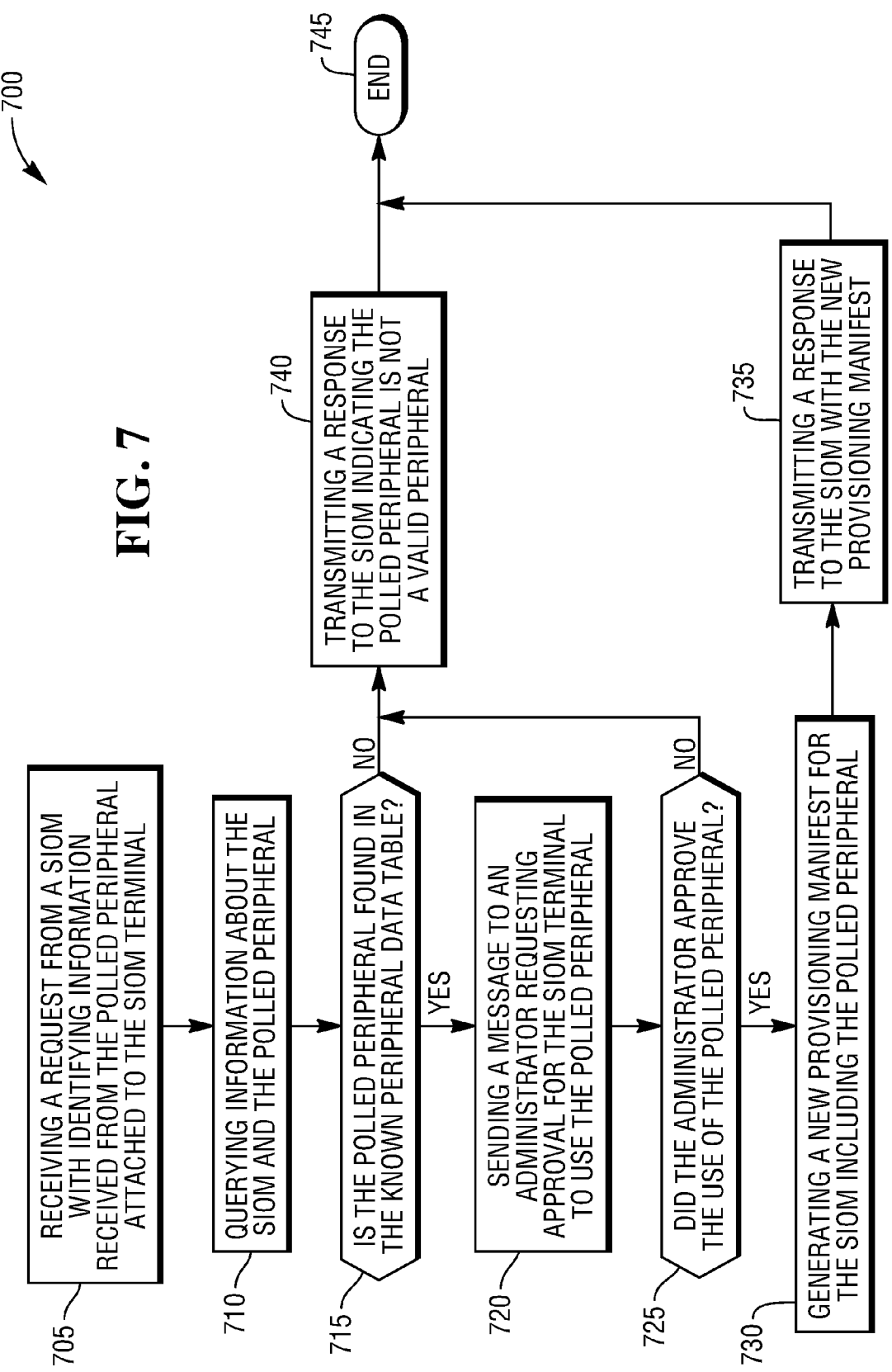

LEARNING A NEW PERIPHERAL USING A SECURITY PROVISIONING MANIFEST

CROSS-REFERENCE TO RELATED APPLICATIONS

This application claims the benefit of U.S. Provisional Application No. 61/695,978, filed Aug. 31, 2012 which is hereby incorporated by reference in its entirety. This application is also related to U.S. Provisional Application No. 61/720,645 titled "Security Module and Method of Securing Payment Information" having the same assignee as this application and which is also hereby incorporated by reference in its entirety. This application is further related to U.S. patent application Ser. No. 13/732,088 titled "A Secure Provisioning Manifest for Controlling Peripherals Attached to a Computer" having the same assignee as this application and which is hereby incorporated by reference in its entirety.

FIELD OF THE INVENTION

The present invention relates to computer terminals used to receive and process financial and/or sensitive information and more specifically to identify a new peripheral attached to a computer terminal using a peripheral learning mode to request authorization to use the new peripheral.

BACKGROUND

Protecting financial and/or sensitive information, including payment card data, personal identification numbers (PINs) and personal identification information from fraud and theft, is a problem for many companies. The Payment Card Industry (PCI) is addressing some of the issues by providing security guidelines for payment peripherals that include card readers, keyboards containing card readers, and PIN entry devices. The PCI guidelines set minimum requirements for payment peripherals that include the use of encrypted data and management of encryption keys.

In addition to payment peripherals, there are other types of peripherals that are used to input valuable and/or sensitive information. For example, an optical code scanner can be used to read a barcode on a personal identification document that has sensitive personal information encoded in the barcode. In another example, a radio frequency identification (RFID) reader can be used to read an RFID chip located in a personal identification document or credit card that has sensitive financial or personal information. These peripherals are attached to a computer terminal used to process purchase and/or financial transactions.

These and other peripherals are used to read financial or sensitive information and certain methods and devices described herein are used to secure both the peripherals and the communications with the peripherals. When one of these peripherals fails, a new peripheral is installed in its place either by a customer service person dispatched to service the terminal or store personnel. However, the security methods will not recognize the new peripheral as an authorized secure peripheral and allow secure operations. The process to authorize the new peripheral can be time consuming and requires input from several parties.

SUMMARY

Among its several aspects, the present invention seeks to overcome or ameliorate at least one of the disadvantages of the prior art, or to provide a useful alternative.

In accordance with the teachings of the present invention, a secure provisioning manifest and a secure I/O module are provided for authenticating and securely communicating with authenticated peripherals attached to a computer and for learning about unauthorized peripherals attached to the computer and for requesting authorization for the unauthorized peripherals.

Among its several aspects, the present invention recognizes there is an advantage to being able to identify and authenticate peripherals attached to a computer and to establish a secure encrypted session to communicate with authenticated peripherals. The advantage includes determining when unauthorized or unsecure peripherals are attached to the computer and further determining if an unauthorized or unsecure peripheral represents a security threat to the computer. When a peripheral represents a security threat, actions are taken to restrict communications with the peripheral or to terminate all normal functions of the computer.

Among its several aspects, the present invention recognizes there is an advantage to being able to identify an unauthorized peripheral attached to the computer and to request authorization for the peripheral to be attached to the computer. The process, when performed by the computer, can minimize down time for the computer if the peripheral is authorized by the process.

Among its several aspects, the present invention recognizes there is an advantage to being able to quickly move a peripheral from one computer to another computer if the move restores one of the computers to full function. Additionally, the present invention recognizes there is an advantage to being able to quickly replace a failed peripheral with a spare peripheral to restore the computer to full function.

Among its several aspects, the present invention recognizes there is an advantage to being able to identify when a security attack against an authenticated peripheral has been occurring or has just started. The advantages include determining the presence of a security attack by monitoring over time certain operating parameters of an authenticated peripheral to detect changes in operating characteristics and by detecting certain operating characteristics associated with a security attack.

In accordance with an embodiment of the present invention, there is provided a method implemented by a secure I/O module of a computer. The computer includes a main processor that executes an operating system but cannot access elements within the secure I/O module. The method comprising: polling a peripheral attached to the computer and receiving identification information for the peripheral; determining the received identification information for the peripheral does not match peripheral identification information stored within a secure provisioning manifest stored in the secure I/O module; transmitting to a remote server a request for authorization to use the polled peripheral wherein the request includes the received identification information for the peripheral; receiving from the remote server a response to the request; and determining the received response includes an updated secure provisioning manifest and performing steps that include: authenticating the peripheral using information stored in the updated secure provisioning manifest; and establishing a secure encrypted communication session with the authenticated peripheral using information stored in the updated secure provisioning manifest.

In accordance with another embodiment of the present invention, there is provided one or more non-transitory digital storage media storing instructions which, when executed by one or more computing devices, cause performance of the method recited above for implementation by the secure I/O module of a computer.

A more complete understanding of the present invention, as well as further features and advantages of the invention, will be apparent from the following Detailed Description and the accompanying Drawings.

BRIEF DESCRIPTION OF THE DRAWINGS

The present invention may take form in various components and arrangement of components and in various methods. The drawings are only for purposes of illustrating example embodiments and alternatives and are not to be construed as limiting the invention. The drawings are not necessarily drawn to scale. Throughout the drawings, like element numbers are used to describe the same parts throughout the various drawings, figures and charts.

FIG. 1 is a high-level block diagram illustrating a transaction system of the present invention.

FIG. 5 is a high-level diagram illustrating a secure provisioning manifest of the present invention.

FIG. 6A is a high-level flow diagram illustrating a method of operating the secure I/O module using the secure provisioning manifest to authenticate and communicate with peripherals attached to the transaction computer and to enter a peripheral learning mode when an unauthorized peripheral is determined to be attached to the transaction computer.

FIG. 6B is a continuation of the high-level flow diagram described in FIG. 6A.

FIG. 7 is a high-level flow diagram illustrating a method of operation for the secure provisioning server when communicating with a secure I/O module operating in the peripheral learning mode.

DETAILED DESCRIPTION

Figure 2A:
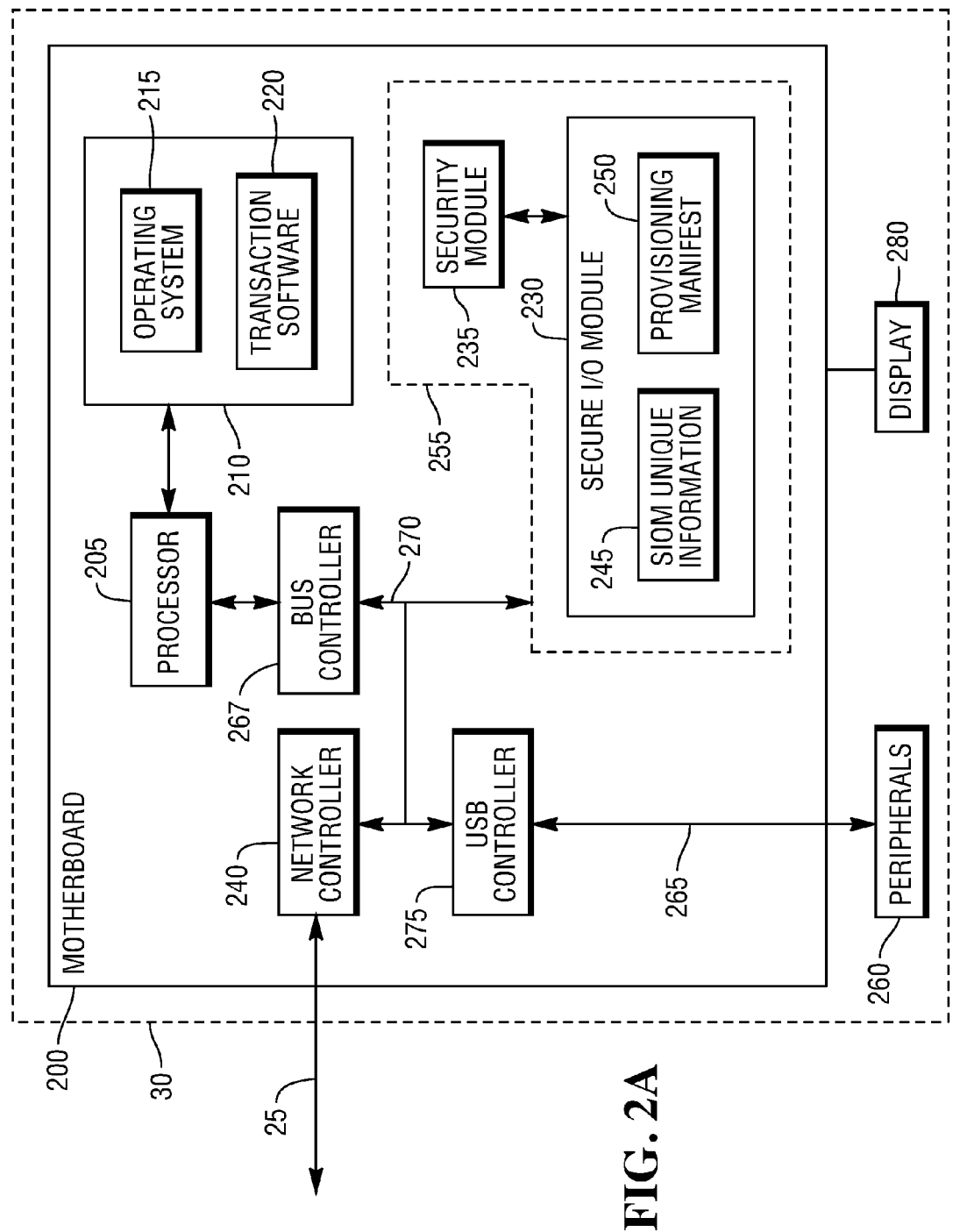
FIG. 2A is a high-level block diagram illustrating selected hardware and software components of one embodiment of a transaction computer.

In the following description, numerous details are set forth to provide an understanding of the claimed invention. However, it will be understood by those skilled in the art that aspects of the claimed invention may be practiced without utilizing all of these details and that numerous variations or modifications from the described embodiments are possible and envisioned.

With reference to FIG. 1, there is provided a high-level block diagram illustrating a transaction system 10 including an enterprise transaction server 15 and an enterprise provisioning server 20 where each server is connected to a plurality of transaction computers $30_{1-X}$ over a network 25. The enterprise transaction server 15 is a secure server and executes a secure transaction service that facilitates transactions between the transaction computers $30_{1-X}$ and external services. The external services may suitably include services provided by financial acquirers that accept credit card transactions and financial institutions that process debit transactions.

A secure server is preferably a server computer physically located within a secure data center. A secure data center limits and controls physical and remote access to computers within the center. The computers within the secure data center are provided with network connections to one or more outside public or private networks so they can provide one or more services to customers. A secure computer may suitably execute software that performs financial transactions or processes valuable and/or sensitive information.

The enterprise provisioning server 20 is a secure server and executes enterprise provisioning software. The enterprise provisioning software maintains data about each of the transaction computers $30_{1-X}$ and a secure I/O module 230 (FIG. 2A) that executes on each of the transaction computers $30_{1-X}$. The data includes unique information that identifies each of the transaction computers $30_{1-X}$ and includes a secure provisioning manifest (FIG. 2, element 250) that includes information identifying peripherals that are authorized to be attached to each of the transaction computers $30_{1-X}$. The enterprise provisioning server 20 also receives status information from each of the transaction computers $30_{1-X}$. The status information may suitably include alert information when an unauthorized peripheral is determined to be attached to one of the transaction computers $30_{1-X}$. The received alert information may suitably cause the enterprise provisioning server 20 to send an alert notice to one or more people authorized to receive such notices and to take action. The alert notices may suitably be sent using email, a short message service (SMS) text message or the like.

The transaction computers $30_{1-X}$ are coupled to the remote enterprise transaction server 15 and enterprise provisioning server 20 via the network 25. The network 25 may suitably include a network which uses a communications protocol based on transmission control protocol/internet protocol (TCP/IP). The network 25 may suitably include a combination of local area and wide area networks. The network 25 may suitably include any combination of wireless or wired networks. The network 25 may suitably include a combination of private and public networks, including a global communication network, also known as the Internet. The term cloud based server is sometimes used and refers to a remote computer server accessed over a public network, such as the Internet.

The transaction computers $30_{1-X}$ may suitably be located within a single location, for example in a single retail store, or they may be divided among many locations across a large geographic area. For example, the transaction computers $30_{1-X}$ may be divided among multiple stores owned by a single company where the stores are located around the world. The transaction computers $30_{1-X}$ may suitably include multiple different types of computers. One example embodiment of the transaction computers $30_{1-X}$ includes a computer configured as a self-service point-of-sale (POS) transaction terminal used to process customer purchase transactions where a customer operates the terminal. Another example embodiment of the transaction computers $30_{1-X}$ includes a computer configured as an assisted point-of-sale (POS) transaction terminal used to process customer purchase transactions where an employee operates the terminal. Other examples of transaction computers include automatic teller machines (ATM), self-service terminals including travel kiosks, tablet computers and credit and debit card equipped gas pumps and the like. Other example transaction computers and environments are also envisioned.

Turning now to FIG. 2A, there is provided a high-level block diagram illustrating selected hardware and software components of one embodiment of a transaction computer 30 that may suitably be used as any one of the transaction computers $30_{1-X}$. The transaction computer 30 includes a motherboard 200, a display 280 and a plurality of peripherals 260 where one or more may suitably be attached to and controlled by the transaction computer 30. The motherboard 200 includes a processor 205, a memory 210, a bus controller 267, a network controller 240, a universal serial bus (USB) controller 275 and a secure processing module 255. The secure processing module 255 includes a security module 235 and the secure I/O module 230. The processor 205 communicates with the memory 210 which includes stored computer instructions that implement an operating system 215 and computer instructions that implement transaction software 220. The processor 205 executes the computer instructions stored in the memory 210. The processor 205 creates a standard data processing environment wherein computer instructions stored in the memory 210 are executed under the control of the operating system 215. While the processor 205 and other processors that are described herein are depicted and referred to as a single processor, multiple processors and processors with multiple processor cores are envisioned and within the scope and definition of this invention.

The memory 210 uses non-transitory storage devices including both volatile and non-volatile memory. The non-volatile memory may suitably include flash memory, other types of solid state electronic memory and rotating storage devices, such as disk drives or the like. Non-volatile memory retains stored information after power is removed from the memory and until power is restored. Computer instructions stored in the memory 210 are executed by the processor 205 and cause the processor 205 to control the devices and peripherals attached to the transaction computer 30 and to provide the services and functions performed by the operating system 215 and the transaction software 220. The operating system 215 may suitably include a Microsoft, Linux, Apple, or other digital computer operating system. The transaction software 220 displays transaction screens on the display 280 for guiding an operator through a transaction and receives operator inputs and selections during the transaction. The transaction software 220 may also process a payment for the transaction by sending transaction information to a third party for processing. In some embodiments, the transaction software 220 relies on other software to process the transaction and provide an acknowledgement once payment has been made.

The transaction computer 30 further includes display graphics circuitry for providing display screens to the display 280. The display 280 may suitably include a flat panel LCD display and it may also include a touch screen device that senses the location of a touch to the display area of the display 280. The bus controller 267 provides a high speed computer bus 270 that allows the processor 205 to communicate with the standard components on the motherboard 200. The network controller 240 provides the hardware and software needed to connect to and support communications with the network 25. The operating system 215 includes driver software that interfaces with the network controller 240 and provides a network stack that supports the communication's protocol used by the network 25. One or more of the peripherals 260 are connected to the transaction computer 30 over a Universal Serial Bus (USB) 265 controlled by the USB controller 275. The USB bus 265 is a powered USB bus where the USB controller 275 provides electrical power needed to power the peripherals 260. The USB controller 275 generates multiple independent powered USB buses 265 (sometimes called ports) where one of the independent powered USB buses is connected to each peripheral 260. In some embodiments, the USB controller 275 includes a power monitoring component that measures the amount of electrical current being used by each of the one or more peripherals 260 attached to each of the USB buses 260. In some embodiments, the USB controller 275 includes an electrical load detection component that detects the number of electrical loads for data signals for each of the powered USB buses 265. The electrical loads can be used to determine the number of devices that are attached to a bus. The number of devices attached to the USB bus 265 for each peripheral is known and should not change over time.

In some embodiments, one or more of the peripherals 260 may communicate over other connections such as serial RS-232, serial RS-485, Firewire, or other circuitry for connecting peripherals. The operating system 215 may establish basic communications with some or all of peripherals 260 connected to the transaction computer 30 at a driver level. An application program interface (API) is provided that uses the driver level connection for each of the peripherals 260. The secure processing module 255 has access to the API to communicate with the peripherals 260.

The secure processing module 255 provides a secure processing environment separate from the standard processing environment provided by the processor 205 executing the computer instructions stored in the memory 210. The secure processing module 255 and the processor 205 can communicate with each other over a computer bus 270. However, the processor 205 does not have access to or control over elements within the secure processing environment provided by the secure processing module 255. More details of the secure processing module 255 are provided below.

In other example embodiments, the security processing module 255 may be external to the transaction computer 30. For example, the security processing module 255 may be incorporated into its own separately housed component for retrofitting existing computers without built-in capability or into a peripheral. Either example may be connected to the transaction computer 30 through peripheral connection circuitry. In another example, the secure processing module 255 may be implemented in a separate secure computer that controls a number of peripherals at different locations, for example, a single secure computer would suitably control the card reader at each gas pump of a gas station and a different transaction computer would process the purchase transaction while communicating with the secure computer to process payments.

The secure processing module 255 may be implemented using digital hardware logic, software instructions, or a combination of both. The secure processing module 255 has a secure processing environment that is separate from the standard processing environment of the motherboard 200 that is created by the processor 205. In some embodiments, both the secure processing environment and the standard processing environment are created by one processor that is running virtual machine software responsible for separating the two environments.

The secure processing module 255 protects customer information received from one or more of the peripherals 260 by establishing a secure encrypted session with each peripheral 260. For example, the secure I/O module 230 may communicate with one of the peripherals 260, such as a card reader peripheral 40 (FIG. 2B) via standard protocols and/or proprietary protocols via the USB controller 275. Once the card reader peripheral 40 is authenticated, the secure I/O module 230 establishes a secure encrypted session with the card reader peripheral 40. The card reader peripheral 40 then encrypts all data it sends to the secure I/O module 230 and only the secure I/O module 230 can decrypt it. The secure I/O module 230 may suitably decrypt and provide the data received from the card reader peripheral 40 to the operating system 215 which provides it to the transaction software 220. Not all data is decrypted and sent to the operating system 215. The secure I/O module 230 also encrypts any data it sends to the card reader peripheral 40. No cryptographic key data is transferred between the secure I/O module 230 and the peripheral during the process of establishing the secure encrypted session. Cryptographic keys need not be communicated because the secure provisioning manifest 250 includes all cryptographic key data needed by the secure I/O module 230 to encrypt and decrypt data communicated between the peripheral and the secure I/O module 230.

The secure I/O module 230 preferably controls the flow of encrypted data from the peripherals 260 independently of the operating system 215, with the operating system 215 only establishing a connection with the peripherals 260 at a driver level. It should also be noted that once the secure session is established with one of the peripherals 260, the data received and transmitted by the driver level connection is encrypted and the operating system 215 cannot decrypt or encrypt the data. Only the secure I/O module 230 can decrypt or encrypt the data.

The secure I/O module 230 is invisible to operating system 215. That is, the operating system 215 has no driver for controlling or direct control over the secure I/O module 230 and no control over the secure encrypted sessions between the secure I/O module 230 and the peripherals 260. The operating system 215 can route data to the secure I/O module 230. For example, the secure I/O module 230 can use the network 25 that is operated by the operating system 215 to communicate with external computers. In this case, the operating system 215 sends and receives data on the network 25 for the secure I/O module 230. It should also be noted that the secure I/O module 230 can have its own interface to the network 25. While the operating system 215 has code to communicate with the secure I/O module 230, the code does not have the ability to control the secure I/O module 230. This arrangement minimizes the chance of a fraudster gaining access to the encryption keys stored in the secure processing module 255 through the operating system 215.

In some embodiments, the Intel Core vPro™ technology is used to implement the present invention. The core of the vPro™ is the processor 205 that executes the operating system 215 and the secure I/O module 230 resides in a Management Engine (ME) which is supported in a separate support chipset. This arrangement also minimizes the chance of a fraudster gaining access to the encryption keys stored in the secure processing module 255 through the operating system 215.

The operating system 215 uses the network controller 240 on the motherboard 200 to communicate over the network 25. In some embodiments, software executing in the secure processing module 255 uses a software interface to the operating system 215 to send and receive information over the network 25. In other embodiments, the secure processing module 255 includes separate network hardware and software, not available to the operating system 215, to communicate with remote computers (such as, the enterprise transaction server 15 and the enterprise provisioning server 20, for example) either over the network 25 or over a different network. In still other embodiments, the secure processing module 255 uses both the interface to the operating system 215 and the separate network hardware and software to communicate with the remote computers.

The secure I/O module 230 controls secure encrypted sessions with the peripherals attached to the transaction computer 30 that are able to support encrypted sessions. The peripherals include the display 280 and one or more of peripherals 260 depicted in FIG. 2B. The secure I/O module 230 polls all attached peripherals upon power up to obtain information that uniquely identifies the peripheral. The information includes the vendor's model, product identification and serial number of the peripheral. The secure I/O module 230 uses the secure provisioning manifest 250 to determine if the secure I/O module 230 is authorized to communicate with each peripheral. The secure provisioning manifest 250 includes peripheral information for each peripheral that the secure I/O module 16 is authorized to communicate with. If the unique information from the peripheral matches corresponding information in the secure provisioning manifest 250 then, the secure I/O module 230 queries the peripheral to determine if it can communicate via an encrypted data link. If the peripheral can communicate via an encrypted data link, then the secure I/O module 230 issues a specific test message to the peripheral, to which the secure I/O module 230 expects a certain encrypted response. If the response matches what is expected, then the secure I/O module 230 establishes a secure encrypted session with the peripheral which causes all data to be encrypted prior to transmission. In some embodiments, the expected encrypted response from the peripheral is a known sequence of text and numbers.

In addition to the initial authentication and establishment of the secure encrypted session with a peripheral, the secure I/O module 230 periodically tests the unique information of the peripheral to ensure the authorized peripheral has not been replaced by a substitute peripheral. If the authorized peripheral has been removed, the secure encrypted session is terminated and the secure I/O module 230 starts the peripheral identification process for any new peripheral that is found.

The secure processing module 255 further includes a security module 235. The security module 235 includes software that implements additional features and functions used to process transactions. These functions include communicating with the enterprise transaction server 15 to process a transaction using information acquired from one or more of the peripherals 260 over a secure encrypted session. The security module 235 also stores encryption keys, which may include communication or session keys, financial provider keys, and retail provider keys.

Figure 2B:
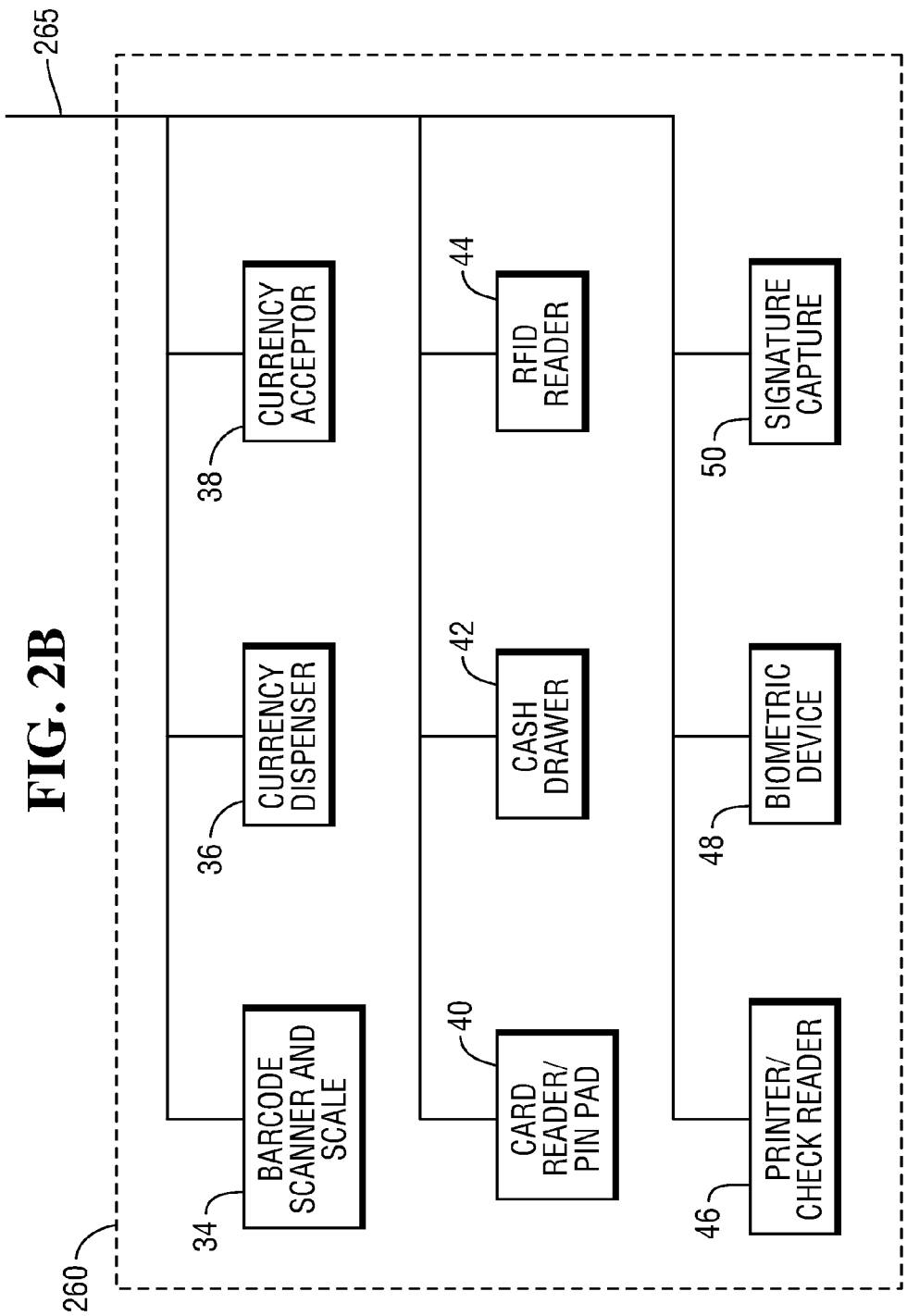
FIG. 2B is a high-level block diagram illustrating selected peripherals supported by the transaction computer of FIG. 2A.

Turning now to FIG. 2B, there is provided a high-level block diagram illustrating selected peripherals 260 that may be attached to the transaction computer 30. The peripherals 260 communicate with the transaction computer 30 using a USB connection or other suitable forms of computer communications. The transaction computer 30 further provides the electrical power to operate the peripherals 260 using the USB connection. In some embodiments, peripherals that have high power demands also have separate power cables. The peripherals 260 depicted in FIG. 2B are not meant to be an exhaustive list nor is it meant to imply that all of the peripherals 260 depicted must be present in any one embodiment of the transaction computer 30 used in the transaction system 10. The peripherals 260 include a barcode scanner and scale 34, a currency dispenser 36, a currency acceptor 38, a card reader/pin pad 40, a cash drawer 42, a radio frequency identification (RFID) reader 44, a printer/check reader 46, a biometric device and a signature capture device 50. In some embodiments, the barcode scanner (also known as an optical code scanner) and scale 34 includes a laser based and an image based scanner for reading optical codes. Some embodiments use either a laser based or an image based scanner.

Figure 3:
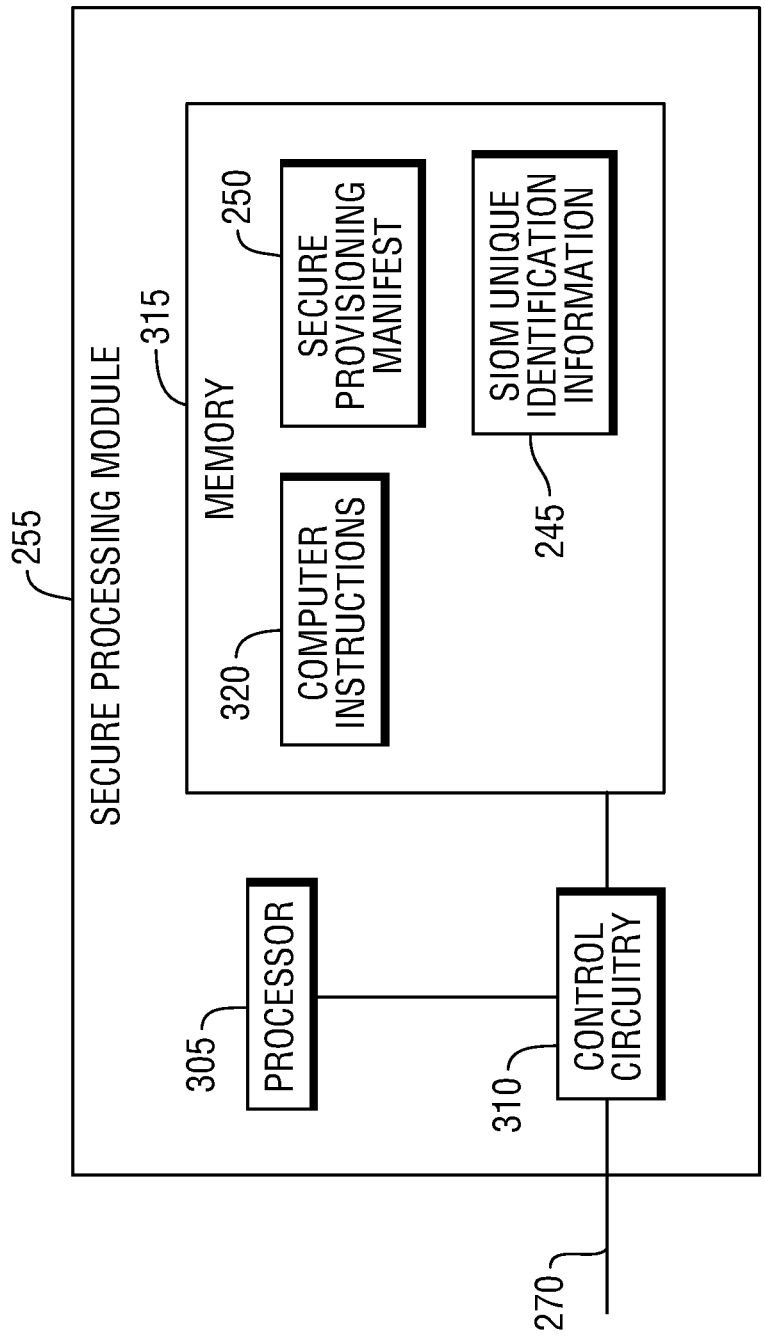
FIG. 3 is a high-level block diagram illustrating selected hardware and software components of a secure processing module.

With reference to FIG. 3, there is provided a high-level block diagram illustrating selected hardware and software components of the secure processing module 255. The secure processing module 255 includes a processor 305, a memory 315 and control circuitry 310. Stored within the memory 315 are computer instructions 320, the secure provisioning manifest 250 and information 245 that uniquely identifies the secure I/O module 230. When the processor 305 executes the computer instructions 320, the computer instructions 320 cause the processor 305 to implement the features and functions performed by the secure I/O module 230 and the security module 235.

The memory 315 is comprised of non-transitory storage devices including both volatile and non-volatile memory. The non-volatile memory may include flash memory and other types of solid state electronic memory that are non-volatile. The processor 305 may include a processor that has multiple processor cores or may be comprised of multiple processors.

The memory 315 further includes the unique identification information 245 for the secure I/O module 230. The unique identification information 245 includes a unique identifier for the secure I/O module 230 and a private cryptographic key (private key) associated with the secure I/O module 230. The private key has a unique public key associated with it. The public key is stored in the enterprise provisioning server 20 and used to encrypt data sent to the secure I/O module 230. The secure I/O module 230 uses its private key to decrypt the data encrypted with its public key. Only the private key can decrypt data encrypted with the public key and only the public key can decrypt data encrypted with the private key.

The computer instructions 320 and the unique identification information 245 are injected or stored in the memory 315 during the process of manufacturing the secure processing module 255. The secure provisioning manifest 250 is stored in the memory 315 and is encrypted using the secure I/O module's 230 public key and the secure I/O module's 230 private key will decrypt it. The secure provisioning manifest 250 can be updated at anytime for any of a number of reasons. The enterprise provisioning server 20 generates a new version of the secure provisioning manifest 250 as needed using the unique public key for the secure I/O module 230.

For example, when a customer service technician replaces a failed peripheral in a transaction computer 30, the technician communicates information identifying the removed peripheral and information uniquely identifying a replacement peripheral to the enterprise provisioning server 20. The enterprise provisioning server 20 then generates an updated secure provisioning manifest 250 for the transaction computer 30 using the public key for the secure I/O module 230 known to be present in that transaction computer 30. The updated secure provisioning manifest 250 is then transmitted to the transaction computer 30 over the network 25. The secure I/O module 230 receives the updated secure provisioning manifest 250 and stores it in the memory 315 replacing the prior version.

The control circuitry 310 allows the processor 305 to communicate with the computer bus 270. This transparency allows the processor 305 to perform a number of software functions and hardware functions that interface with software executed by the processor 205. For example, the processor 305 can generate a logical peripheral interface that simulates a driver interface to one of the peripherals 260. The processor 205 accesses the logical peripheral interface instead of the physical peripheral interface. The processor 305 has access to the physical peripheral using the computer bus 270. In some embodiments, substituting the logical peripheral interface for the physical peripheral interface is transparent to the software being executed by the processor 205. This allows for the use of legacy software that does not need to be updated. In some embodiments, an application program interface (API) is used by software executed by the processor 205 to communicate with the peripherals 260. For certain peripherals, the API communicates over the computer bus 270 with the control circuitry 310 instead of communicating directly with the peripheral. The computer instructions 320 executed by the processor 305 receive and implement the communication requests.

In one embodiment, the secure processing module 255 is a hardware module installed on the motherboard 200. In some embodiments, the secure processing module 255 is preferably tamper resistant to prevent access to the cryptographic keys stored in the memory 315. Tamper resistance may suitably include one or more electrical and mechanical safeguards to prevent physical tampering with the secure processing module 255. For example, the secure processing module 255 may include electrical circuits and switches that detect an unauthorized opening of the enclosure of the transaction computer 30, or physical intrusion into the secure processing module 255 or an enclosure around the secure processing module 255, and upon detection, erase the cryptographic keys and optionally the software stored in the memory 315, thereby disabling the secure processing module 255.

In one embodiment, the secure processing module 255 includes a processor 305, a memory 315 and control circuitry 310. Computer instructions 320 and data including information uniquely identifying the secure I/O module 230 and a secure provisioning manifest 250 are preloaded into the memory 315 before the secure processing module 255 is mounted on the motherboard 200, or the computer instructions 320 and the data are loaded into the secure processing module 255 after it is mounted on the motherboard 200, but prior to being shipped to a customer in the terminal computer 30.

The secure processing module 255 includes the security module 235 and the secure I/O module 230. Both of these modules may suitably be implemented in digital hardware or software or a combination of both.

Figure 4:
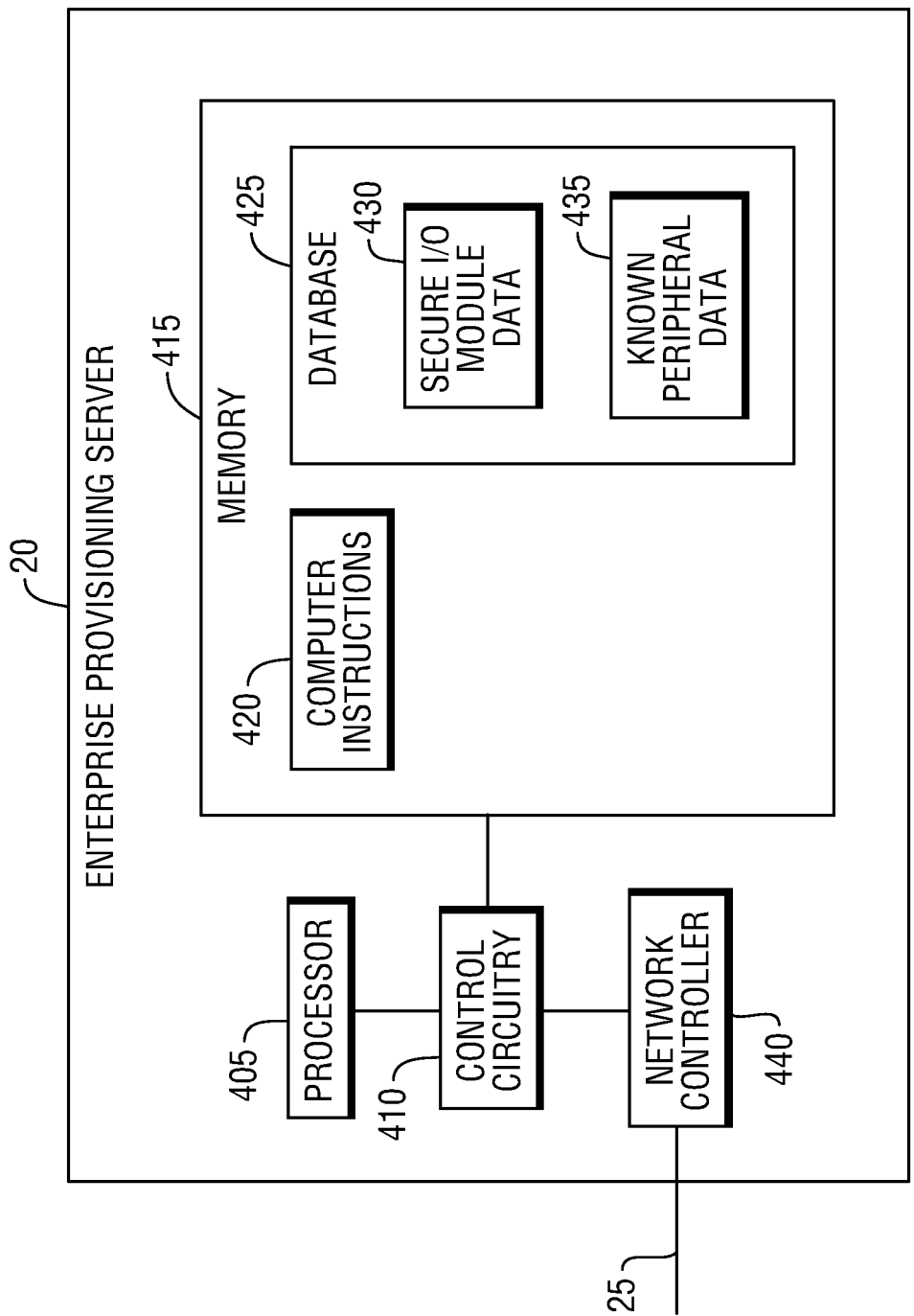
FIG. 4 is a high-level block diagram illustrating one example embodiment of an enterprise provisioning server.

Turning now to FIG. 4, there is provided a high-level block diagram illustrating one example embodiment of the enterprise provisioning server 20. The enterprise provisioning server 20 includes a processor 405, control circuitry 410, a network controller 440 and a memory 415. The control circuitry 410 includes different components that allow the processor 405 to communicate with the memory 415 to read and write to the contents of the memory and to communicate with the network controller 440 to send and receive data across the network 25.

The memory 415 uses non-transitory storage devices including both volatile and non-volatile memory. The non-volatile memory may suitably include flash memory, other types of solid state electronic memory and rotating storage devices, such as disk drives or the like. Non-volatile memory retains stored information after power is removed from the memory and until power is restored.

Stored within the memory 415 are computer instructions 420 and data for a database 425. The computer instructions 420 include instructions or software that implement an operating system, a database and one or more applications. The processor 405 executes the computer instructions 420 which cause the processor 405 to implement the operating system, the database and features and functions associated with the one or more applications. At least one of the one or more applications is an enterprise provisioning application that implements the enterprise provisioning functions described herein. The functions include maintaining data for each secure I/O module 230 and all known peripherals. The maintained data includes a list of known peripherals that have been authorized to be attached to each transaction computer $30_{1-X}$ controlled by a secure I/O module 230. Additional functions include generating a secure provisioning manifest 250 for each transaction computer $30_{1-X}$ that is keyed to the secure I/O module 230 executing on a transaction computer.

Not all known peripherals are in use and attached to a transaction computer 30. Some known peripherals are stored for future use. These known peripherals can be stored in a parts depot and are shipped to an end customer when needed. These peripherals are typically used to replace failed peripherals. The location of each known peripheral is maintained by the enterprise provisioning server 20. When a known peripheral is stored in a parts depot, its location is shown as the location of the parts depot. The location data may suitably include the actual location of the parts depot and the name of the parts depot. When the peripheral is shipped to a customer, the location data is updated to the customer location where the peripheral will be used. In some cases, a store with a large number of installed transaction computers 30 will keep one or more spare peripherals on site. This shortens the time required to replace a failed peripheral attached to a transaction computer 30 because field service personnel or store personnel can replace the failed peripheral with a spare peripheral already located at the store.

The database 425 includes data about all known peripherals that are managed by the enterprise provisioning server 20. The enterprise provisioning server 20 manages transaction computers 30 that are used by multiple different customers in multiple different locations. For example, company ABC has 100 store locations where each store has 5 transaction computers and company XYZ has 5000 store locations in different countries where each store has between 5 and 20 transaction computers. The enterprise provisioning server 20 maintains data on each of the transaction computers 30 and the attached known peripherals for both companies. The maintained data includes location information for each transaction computer 30 and each known peripheral attached to the transaction computers 30. In addition, the enterprise provisioning server 20 maintains data on known peripherals that are available for use but not currently attached to a transaction computer 30. These known peripherals maybe stored at a parts depot, a store location or other suitable locations. The maintained data for each known peripheral further includes unique identification information that suitably includes a model number, a serial number and a cryptographic key used to establish secure communications between the known peripheral and the secure I/O module 230 it is or will be attached to. This information is also used to generate a secure provisioning manifest for a transaction computer 30 that a known peripheral is attached to or is targeted to be attached to.

The database 425 further includes secure I/O module data 430 that includes information about each secure I/O module 230 managed by the enterprise provisioning server 20. The data 430 for each secure I/O module 230 includes, but is not limited to, the location of the transaction computer 30 that is executing the secure I/O module 230, the unique information that identifies the secure I/O module 230 and the known peripherals that are authorized to be attached to the transaction computer 30. The enterprise provisioning application uses this data to generate a secure provisioning manifest 250 for each transaction computer 30 where the secure provisioning manifest 250 is encrypted so that only the secure I/O module 230 executing on the targeted transaction computer 30 is able to decrypt it.

With reference to FIG. 5, there is provided a high-level diagram illustrating an example of the secure provisioning manifest 250. The secure provisioning manifest 250 is delivered to and stored in the secure processing module 255 encrypted using the public key associated with the secure I/O module 230. When data from the secure provisioning manifest 250 is required, the secure I/O module 230 decrypts it using the private key 245 associated with the secure I/O module 230 and stored in the memory 315. A successful decryption of the secure provisioning manifest 250 also authenticates the secure provisioning manifest 250.

The information depicted in this embodiment of the secure provisioning manifest 250 is not meant to be limiting or all inclusive. In this example embodiment, the secure provisioning manifest 250 is divided into a first section 505 and second section 510. The first section 505 includes 12 records numbered 1-12. Other embodiments will include a different number of records. Record 1 includes information that identifies the secure transaction service and the secure enterprise transaction server 15 used to process financial transactions for the transaction computer 30. Record 2 includes information that uniquely identifies the secure I/O module 230 installed on the transaction computer 30. Record 3 includes information that identifies an issue date for the secure provisioning manifest 250. Record 4 includes information that identifies an expiration date for the secure provisioning manifest 250. When this date is reached or just prior to the date, the secure I/O module 230 requests a new secure provisioning manifest 250 from the enterprise provisioning server 20. Record 5 includes information that identifies a grace period for the secure provisioning manifest 250 which defines a period of time (if any) an expired secure provisioning manifest 250 may be used after its expiration date.

Records 6-12 are policy records. The secure provisioning manifest 250 may include any number of policy records. This embodiment includes seven policy records. A policy record includes a policy rule that defines how a resource is used. Each policy record is associated with a peripheral or a resource of the transaction computer 30. There can be multiple policy records for each peripheral or resource. For example, the barcode scanner 34 can read 1D barcodes and 2D barcodes. 1D barcodes are typically used to identify items presented for purchase while certain 2D barcodes may in addition be used to encode sensitive information on identification documents. Therefore, a first policy record associated with the barcode scanner peripheral 34 could have a rule requiring that data read from 1D barcodes be returned to the operating system 215 as decrypted clear text. A second policy record also associated with the barcode scanner peripheral 34, has a rule requiring that data read from 2D barcodes is returned to the operating system 215 as encrypted text to protect the data. The secure I/O module 230 decrypts the data and retains a decrypted version of the data and uses it to process a financial transaction, if needed. However, the applications executed by the processor 205 of the transaction computer 30 cannot decrypt the data and can only process the data sent in clear text form.

Records 6 and 7 are policy records associated with the PIN or pin pad component of the magnetic stripe reader peripheral 40. Record 8 is a policy record associated with the secure transaction service running on the enterprise transaction server 15. The rule can define which transactions are sent to the secure transaction service for processing and which transactions are sent to the operating system 215 for legacy processing by the transaction software 220. Record 9 is a policy record associated with the barcode scanner 34. Record 10 is a policy record associated with the magnetic stripe reader peripheral 40. Record 11 is a policy record associated with the near field communications peripheral which is included in the RFID reader 44. Record 12 is a policy record associated with the network controller 240 function of the motherboard 200. This record would include a rule on using the network controller 240 to communicate with external computers.

Certain legacy peripherals cannot support encrypted secure sessions so policy records are set up for these peripherals that state the peripheral cannot support encrypted sessions so do not attempt to establish a secure session.

The second section 510 of the secure provisioning manifest 250 includes a list of peripherals that are authorized to be connected to the transaction computer 30. Any peripheral attached to the transaction computer 30 that is not listed in this section of the secure provisioning manifest 250 is not authorized to be attached to the transaction computer 30 and the secure I/O module 230 will not communicate with it. The operating system 215 may still be able to communicate with the peripheral in some situations. However, the secure I/O module 230 will not communicate with the peripheral and will send an alert or error report to the enterprise provisioning server 20 listing any acquired information about the unauthorized peripheral. A policy record can be included with a rule that determines what action the secure I/O module 230 should take when an unauthorized peripheral is found. The rule may cause the secure I/O module 230 to shut down the transaction computer 30 or it may allow normal operations of the peripheral if it is considered a legacy peripheral.

The second section 510, as depicted in this example, has information on five peripherals. The record for each peripheral includes information 515 unique to each peripheral. The information 515 includes an item identification, a public key associated with the peripheral, a vendor identification, a vendor product identification, a vendor serial number and a reference to the policy records that should be applied to this peripheral. The public key is a cryptographic key associated with a private key where both keys are associated with the peripheral. The private key is stored in the peripheral. The secure I/O module 230 uses the public key to encrypt and decrypt secure data sent to and received from the peripheral over a secure session with the peripheral.

In some embodiments, the vendor serial number may include a range of serial numbers instead of a single serial number. When a range is specified, a peripheral will be authenticated if the serial number for the peripheral falls within the specified range. Using a range of serial numbers allows a customer that operates a number of transaction computers 30 to replace a peripheral in one transaction computer with a similar model peripheral from another transaction computer or to use a spare without having to call and wait for a customer service person to arrive and perform a peripheral update. A typical customer might want to do this if a peripheral failed.

The peripheral's public key and private key form a unique public/private key pair that has been generated and associated with the peripheral. In some embodiments, the key pair is generated and the private key is injected or stored in the peripheral's long term memory at some point during the process of manufacturing the peripheral. The public key will be securely transmitted to the enterprise provisioning server 20 during a registration process for the peripheral. In the future, the public key will be included in a secure provisioning manifest 250 sent to a secure I/O module 230 that will communicate with the peripheral once it is attached to a transaction computer 30. When the peripheral is registered with the transaction system 10, information about the peripheral including the vendor's model number, the vendor's serial number, the vendor's product identification and the public key are sent to the enterprise provisioning server 20 and stored in a database of registered peripherals 435.

After the peripheral has been registered, the peripheral is attached to the transaction computer 30 either during the manufacture of the transaction computer 30 or during a field upgrade or replacement process performed on the transaction computer 30. An authorized person then identifies the peripheral and the transaction computer 30 to the enterprise provisioning server 20 and informs the enterprise provisioning server 20 that the peripheral has been attached to the transaction computer 30. The enterprise provisioning server 20 then retrieves information about the peripheral from the database of registered peripherals and retrieves a copy of the current secure provisioning manifest 250 for the transaction computer 30 from a database of registered transaction computers. The enterprise provisioning server 20 adds a new record to the second section 510 of the retrieved version of the secure provisioning manifest 250 for the transaction computer 30 and further adds a policy record if needed. The new record includes the information from the peripheral database that uniquely identifies the peripheral. The updated version of the secure provisioning manifest 250 is then encrypted using the public key associated with the secure I/O module 230 and transmitted to the transaction computer 30. The enterprise provisioning server 20 replaces the old version of the secure provisioning manifest 250 stored in the database of registered transaction computers and associated with the transaction computer 30 with the updated version of the secure provisioning manifest 250. Once the secure I/O module 230 receives the updated secure provisioning manifest 250 and authenticates it, the secure I/O module 230 will recognize the newly attached peripheral and authorize communications with it.

Turning to FIG. 6A, there is provided a high-level flow diagram 600 illustrating a method of operating the secure I/O module 230 using the secure provisioning manifest 250 to authenticate and communicate with peripherals 260 attached to the transaction computer 30 and to enter a peripheral learning mode when an unauthorized peripheral 260 is determined to be attached to the transaction computer 30. The peripheral learning mode allows the secure I/O module 230 to identify the unauthorized peripheral 260 and to request authorization to use the unauthorized peripheral 260 from the enterprise provisioning server 20. This provides a quick method of moving a peripheral 260 from one transaction computer 30 to another or for replacing a peripheral 260 with a local spare while still maintaining a high level of security.

In step 605, the secure I/O module 230 authenticates the secure provisioning manifest 250 stored in the memory 315 of the secure processing module 255. The secure provisioning manifest 250 has been encrypted using the secure I/O module's 230 public key. Only the secure I/O module's 230 private key can successfully decrypt the encrypted secure provisioning manifest 250. The secure I/O module performs a decrypt operation on the encrypted secure provisioning manifest 250 using the private key 245 stored in the memory 315. The secure provisioning manifest 250 is authenticated if the decrypt operation successfully generates a proper clear text version of the secure provisioning manifest 250. The secure I/O module 230 can determine if the decrypt operation was successful by calculating a checksum for the decrypted version secure provisioning manifest 250 and comparing it to a checksum stored in the secure provisioning manifest 250. If they match, the decrypt operation was successful. If the decrypt operation is not successful, the secure I/O module 230 transmits an error report to the enterprise provisioning server 20. In some embodiments, the secure I/O module 230 will also stop the transaction computer 30 from performing any transactions until a new secure provisioning manifest 250 is received and authenticated. It should be noted that both the public and private keys described herein are kept private and controlled.

Another function of the secure I/O module 230 is to authenticate peripherals 260 attached to the transaction computer 30 and then to establish a secure encrypted communication session with each authenticated peripheral 260. The secure I/O module 230 polls in turn each peripheral attached to the transaction computer 30 and obtains information that uniquely identifies each peripheral. The information preferably includes a vendor identification, a vendor product identification and a vendor serial number for each peripheral.

The secure I/O module 230 compares the information received from a polled peripheral 260 with peripheral information stored in the secure provisioning manifest 250. If there is a match, the secure I/O module 230 attempts to establish a secure encrypted communication session with the polled peripheral 260 using a public key for the polled peripheral 260 that is stored in the secure provisioning manifest 250 with the identifying information. The public key is used to encrypt data sent to the peripheral and to decrypt data received from the peripheral. If the secure encrypted communication session is successfully established, the poled peripheral 260 is authenticated. If the identifying information does not match an entry in the secure provisioning manifest 250 or the secure encrypting communication session fails, the polled peripheral is not authenticated and a status is set indicating the polled peripheral is not authorized to be connected to the transaction computer 30.

In step 610, the secure I/O module 230 polls a peripheral attached to the transaction computer 30 to obtain identifying information for the peripheral.

In step 615, the secure I/O module 230 determines if the obtained identifying information matches any peripherals identified in the secure provisioning manifest 250. If no match is found, control passes to section A of FIG. 6B. If a match is found, control passes to step 620.

In step 620, the secure I/O module 230 establishes a secure encrypted communication session with a peripheral 260 attached to the transaction computer 30 using a unique public key from the secure provisioning manifest 250.

In step 625, the secure I/O module 230 authenticates the peripheral 260 attached to the transaction computer 30 after the secure encrypted communication session is successfully established.

In step 630, the secure I/O module 230 sends and receives encrypted data to the peripheral 260 using the secure encrypted communications session. The secure I/O module 230 communicates a portion of the received data, in clear text form, to the software being executed by the main processor on the motherboard. The secure I/O module 230 also receives data from software being executed by the main processor on the motherboard and sends it to the peripheral 260 as encrypted data over the secure encrypted communications session. The secure I/O module 230 continues to maintain the secure encrypted communication session for this peripheral and control passes to the step 610 where additional peripherals 260 are polled.

Turning to FIG. 6B, there is provided a continuation of the high-level flow diagram 600 described in FIG. 6A.

In step 650, the identifying information received from the polled peripheral 260 has failed to match any peripheral entry found in the secure provisioning manifest 250. However, rather than immediately marking the peripheral as unauthorized, the secure I/O module 230 enters a peripheral learning mode to attempt to have the peripheral 260 authorized. In this step, the secure I/O module 230 sends the identifying information from the polled peripheral 260 to the enterprise provisioning server 20 with a request to authorize the polled peripheral 260.

In step 655, the secure I/O module 230 receives a response to the request sent in step 650 from the enterprise provisioning server 20. If the enterprise provisioning server 20 has authorized the polled peripheral 260, the response will include a new and updated secure provisioning manifest 250 that will replace the current secure provisioning manifest 250 being used by the secure I/O module 230. If the enterprise provisioning server 20 does not authorize the polled peripheral 260, no new secure provisioning manifest 250 will be included in the response but the response will include a status indicating the peripheral has not been authorized.

In step 660, the secure I/O module 230 determines if a new provisioning manifest 250 has been included in the received response. If there is a new provisioning manifest 250, control passes to step 665. If no new provisioning manifest 250 is included, control passes to step 670.

In step 665, the secure I/O module 230 replaces the current secure provisioning manifest 250 with the new secure provisioning manifest 250. The process of authenticating the polled peripheral terminates and control passes to section B on FIG. 6A where the just stored secure provisioning manifest 250 is authenticated and the peripheral polling process continues.

In step 670, the enterprise provisioning server 20 has rejected authorizing the polled peripheral 260. The secure I/O module 230 updates a status for the peripheral 260 indicating the polled peripheral 260 has failed authentication and no secure communications will be established with the peripheral. Control then passes to section C on FIG. 6A where the next peripheral is polled.

Turning to FIG. 7, there is provided a high-level flow diagram 700 illustrating a method of operation for the secure provisioning server 20 when communicating with a secure I/O module 230 operating in the peripheral learning mode.

In step 705, the enterprise provisioning server 20 receives a request over the network 25 from a secure I/O module 230 (SIOM) requesting authorization for a peripheral found to be attached to the transaction computer 30 that is executing the secure I/O module 230. The request includes identifying information for the polled peripheral 260.

In step 710, the enterprise provisioning server 20 uses the peripheral identifying information to query a database table 435 of known peripheral data and information identifying the secure I/O module 230 to query a database table of secure I/O module data 430. The known peripheral data table 435 includes information on all peripherals that are managed by the enterprise provisioning server 20. The information on each known peripheral includes, but is not limited to, a vendor identification, a vendor product identification, a vendor serial number, a current location of the known peripheral, a public key for the known peripheral and the type of transaction computers 30 it can be attached to. The secure I/O module data 430 includes information on all secure I/O modules managed by the enterprise provisioning server 20. The information on each secure I/O module 230 includes, but is not limited to, a transaction computer 30 that is executing the secure I/O module 230, a public key for the secure I/O module 230, a unique address for communicating with the secure I/O module 230, a location for the secure I/O module 230, the type of transaction computer 30 and a list of all peripherals authorized to be attached to the transaction computer 30. In some embodiments, the information on each peripheral authorized to be attached includes a database link to an entry in the known peripheral data table 435.

In step 715, the enterprise provisioning server 20 determines if a known peripheral from the known peripheral data table 435 matches the received peripheral identifying information. If no match is found, control passes to step 740. If a match is found, control passes to step 720.

In step 720, the enterprise provisioning server 20 sends a message to a provisioning administrator requesting approval to allow the polled peripheral to be added as an authorized attached peripheral to the transaction computer 30 executing the secure I/O module 230. The provisioning administrator is a person. The enterprise provisioning server 20 has a list of one or more provisioning administrators that are authorized to approve these types of requests. The enterprise provisioning server 20 includes in the request information about the customer, the transaction computer 30 and the peripheral. The message includes a method for the provisioning administrator to respond by either approving or disapproving the request.

In step 725, the enterprise provisioning server 20 receives a response from the provisioning administrator and determines if the request was approved or disapproved. If the request is not approved by the administrator, control passes to step 740. If the request is approved by the provisioning administrator, control passes to step 730.

In step 730, the enterprise provisioning server 20 updates the data 430 for the secure I/O module 230 to show the requested peripheral 260 is now authorized to be attached. The enterprise provisioning server 20 then generates a new secure provisioning manifest 250 for the secure I/O module 230 that includes data for the requested peripheral 260.

In step 735, the enterprise provisioning server 20 transmits a response to the secure I/O module 230 that includes a new secure provisioning manifest 250 and status that indicates the approval to attach to the peripheral. Control then passes to step 745 where processing of this request ends.

In step 740, the enterprise provisioning server 20 transmits a response to the secure I/O module 230 that does not include a new secure provisioning manifest 250 but does include a status that indicates the peripheral is not authorized to be attached. Control then passes to step 745 where processing of this request ends.

In some embodiments, the provisioning administrator will update settings maintained by the enterprise provisioning server 20 that control operation of secure I/O modules 230. These settings will allow the enterprise provisioning sever 20 to automatically authorize the attachment of a peripheral to transaction computer when the peripheral is known to be located at the same customer location as the transaction computer.

Although the present invention has been described with particular reference to certain preferred embodiments thereof, variations and modifications of the present invention can be effected within the spirit and scope of the following claims.

What is claimed is:

1. A method implemented by a secure I/O module of a computer, the computer includes a main processor that executes an operating system but cannot access elements within the secure I/O module, the method comprising:

polling a peripheral attached to the computer and receiving identification information for the peripheral;

determining the received identification information for the polled peripheral does not match peripheral identification information stored within a secure provisioning manifest stored in the secure I/O module, the secure provisioning manifest stored in an encrypted form, the determining including decrypting the stored secure provisioning manifest, wherein the secure I/O module is a part of a motherboard for the computer but separate from an operating system processing on the motherboard and separate from a processing environment of a processor associated with the computer, and wherein the secure I/O module interacts with the computer through a bus connection, the secure I/O module representing a separate and secure processing environment within the computer;

transmitting to a remote server a request for authorization to use the polled peripheral wherein the request includes the received identification information for the peripheral;

receiving from the remote server a response to the request;

determining the received response includes an updated secure provisioning manifest and performing steps that include:

authenticating the peripheral using information stored in the updated secure provisioning manifest;

storing the updated secure provisioning manifest in the secure I/O module as the secure provisioning manifest for the secure I/O module; and establishing a secure encrypted communication session with the authenticated peripheral using information stored in the updated secure provisioning manifest; and wherein:

the secure provisioning manifest and the updated secure provisioning manifest are encrypted prior to being transmitted to the secure I/O module; and the secure I/O module authenticates both the secure provisioning manifest and the updated secure provisioning manifest by decrypting the manifest using a cryptographic key stored in the secure I/O module.

2. The method of claim 1, further comprising:

determining the received response does not include an updated secure provisioning manifest and performing steps that include:

updating a status for the peripheral indicating the peripheral failed authentication and that secure communications cannot be established with the peripheral.

3. The method of claim 1, wherein the identification information received from a peripheral includes a unique serial number for the peripheral.

4. The method of claim 1, wherein the identification information received from a peripheral includes a model number for the peripheral.

5. The method of claim 1, wherein the secure provisioning manifest includes a plurality of peripheral data entries where each peripheral data entry includes identification information for a peripheral that is authorized to be attached to the computer.

6. The method of claim 5, wherein each peripheral data entry further includes a cryptographic key associated with a peripheral and used by the secure I/O module to establish a secure encrypted communication session with the peripheral.

7. The method of claim 1, wherein the peripheral attached to the computer is a card reader with a pin pad entry device.

8. The method of claim 1, wherein the remote server is an enterprise provisioning server computer.

9. A method implemented by an enterprise provisioning server computer, the method comprising:
receiving a request for an updated secure provisioning manifest from a secure I/O module executing on a computer, the request including identification information for a peripheral attached to the computer, and wherein the secure I/O module is a part of a motherboard for the computer but separate from an operating system processing on the motherboard and separate from a processing environment of a processor associated with the computer, and wherein the secure I/O module interacts with the computer through a bus connection, the secure I/O module representing a separate and secure processing environment within the computer;
determining the peripheral is a known peripheral after querying data stored on the enterprise provisioning server computer that lists all known peripherals;
receiving, from a provisioning administrator, an approval to attach the known peripheral to the computer;
generating, after receiving the approval, a response that includes a secure provisioning manifest for the secure I/O module which includes information for all peripherals authorized to be attached to the computer including the known peripheral; and
transmitting the generated response to the secure I/O module on the computer.

10. The method of claim 9, further comprising:
transmitting to the provisioning administrator a request for approval to attach the known peripheral to the computer.

11. The method of claim 9, wherein generating the secure provisioning manifest includes encrypting the secure provisioning manifest prior to transmission using a cryptographic key uniquely associated with the secure I/O module.

12. The method of claim 9, further comprising:
storing, after receiving the approval, data on the enterprise provisioning server computer wherein the data includes identification information for the known peripheral and information authorizing attachment to the computer.

13. The method of claim 9, further comprising:
receiving, from a provisioning administrator, a disapproval to attach the known peripheral to the computer.

14. The method of claim 13, further comprising:
generating, after receiving the disapproval, a response that includes a status indicating the known peripheral is not authorized for attachment to the terminal and wherein the response does not include a secure provisioning manifest.

15. A secure transaction system comprising:
a computer data network;
an enterprise provisioning server computer connected to the network and including a processor and data storage;
a computer in communication with the enterprise provisioning server computer over the network, the computer including a secure I/O module and a main processor configured to execute an operating system, and the secure I/O module is a part of a motherboard for the computer but separate from the operating system processing on the motherboard and separate from a processing environment of the main processor associated with the computer, and wherein the secure I/O module interacts with the computer through a bus connection, the secure I/O module representing a separate and secure processing environment within the computer where the secure I/O module includes a processor configured to execute instructions that cause the processor to perform steps that include:
polling a peripheral attached to the computer and receiving identification information for the peripheral;
determining the received identification information for the peripheral does not match peripheral identification information stored within a secure provisioning manifest stored in the secure I/O module, the secure provisioning manifest stored in an encrypted form, the determining including decrypting the stored secure provisioning manifest;
transmitting, to the enterprise provisioning server computer, a request for an updated secure provisioning manifest wherein the request includes the received identification information for the peripheral;
receiving, from the enterprise provisioning server computer, a response to the request;
determining the received response includes an updated secure provisioning manifest and performing steps that include:
authenticating the peripheral using information stored in the updated secure provisioning manifest;
storing the updated secure provisioning manifest in the secure I/O module as the secure provisioning manifest for the secure I/O module; and
establishing a secure encrypted communication session with the authenticated peripheral using information stored in the updated secure provisioning manifest; and
wherein:
the secure provisioning manifest and the updated secure provisioning manifest are encrypted prior to being transmitted to the secure I/O module; and
the secure I/O module authenticates both the secure provisioning manifest and the updated secure provisioning manifest by decrypting the manifest using a cryptographic key stored in the secure I/O module.

16. The system of claim 15, wherein the processor in the enterprise provisioning server computer is configured to execute instructions that cause the processor to perform steps that include:

receiving a request for an updated secure provisioning manifest from the secure I/O module executing on the computer, the request including identification information for a peripheral attached to the computer;

determining the peripheral is a known peripheral after querying data stored on the enterprise provisioning server computer that lists all known peripherals;

receiving, from a provisioning administrator, an approval to attach the known peripheral to the computer;

generating, after receiving the approval, a secure provisioning manifest for the secure I/O module that includes information for all peripherals authorized to be attached to the computer including the known peripheral; and transmitting the secure provisioning manifest to the secure I/O module on the computer.

17. The method of claim 16, further comprising:

receiving, from a provisioning administrator, a disapproval to attach the known peripheral to the computer; and generating, after receiving the disapproval, a response that includes a status indicating the known peripheral is not authorized for attachment to the terminal and wherein the response does not include a secure provisioning manifest.

* * * * *